(12) United States Patent
Briglia

(10) Patent No.: US 7,467,527 B2
(45) Date of Patent: Dec. 23, 2008

(54) METHOD AND APPARATUS FOR THE PRODUCTION OF CARBON MONOXIDE AND/OR HYDROGEN AND/OR A MIXTURE OF HYDROGEN AND CARBON MONOXIDE BY CRYOGENIC DISTILLATION

(75) Inventor: Alain Briglia, Corze (FR)

(73) Assignee: L'Air Liquide, Societe Anonyme A Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 457 days.

(21) Appl. No.: 10/573,911

(22) PCT Filed: Oct. 14, 2004

(86) PCT No.: PCT/FR2004/050502

§ 371 (c)(1),
(2), (4) Date: Mar. 29, 2006

(87) PCT Pub. No.: WO2005/040704

PCT Pub. Date: Jun. 5, 2005

(65) Prior Publication Data

US 2007/0033967 A1    Feb. 15, 2007

(30) Foreign Application Priority Data

Oct. 20, 2003   (FR) .................... 03 50706

(51) Int. Cl.
*F25J 3/00* (2006.01)
(52) U.S. Cl. .......................... 62/617; 62/620
(58) Field of Classification Search ............ 62/617, 62/620, 624, 625
See application file for complete search history.

(56) References Cited

U.S. PATENT DOCUMENTS 4,650,814 A * 3/1987 Keller .................. 518/703

(Continued)

FOREIGN PATENT DOCUMENTS

| EP | 0 289 877 | 11/1988 |
| EP | 0 790 212 | 8/1997 |
| FR | 2 832 398 | 5/2003 |
| FR | 2 838 424 | 10/2003 |

OTHER PUBLICATIONS

International Search Report for PCT/FR2004/050502.
Ullmann's Encyclopedia of Industrial Chemistry, 5th edition, vol. A12, p. 271.

*Primary Examiner*—William C Doerrler
(74) *Attorney, Agent, or Firm*—Elwood Haynes

(57) ABSTRACT

The invention provides an installation for the production of hydrogen and/or carbon monoxide and/or a mixture of hydrogen and carbon monoxide, by separating a mixture to be processed (1) which contains at least carbon monoxide and hydrogen. Said installation comprises a production apparatus (9), for producing a feed mixture (3), a separating unit (BF), means for supplying the feed mixture to the separating unit, means for collecting hydrogen and/or carbon monoxide and/or a mixture of both products (7, 8), derived from the separating unit, means for drawing off at least one recycling gas (6) from the separating unit, means for returning said recycling gas upstream of the separating unit, for separating said gas simultaneously with the feed mixture from the production apparatus and means for modifying the rate and composition of said feed mixture, by modifying the operation of the production apparatus, according to the rate and composition of said at least one recycling gas.

16 Claims, 1 Drawing Sheet

U.S. PATENT DOCUMENTS

Figure 1:
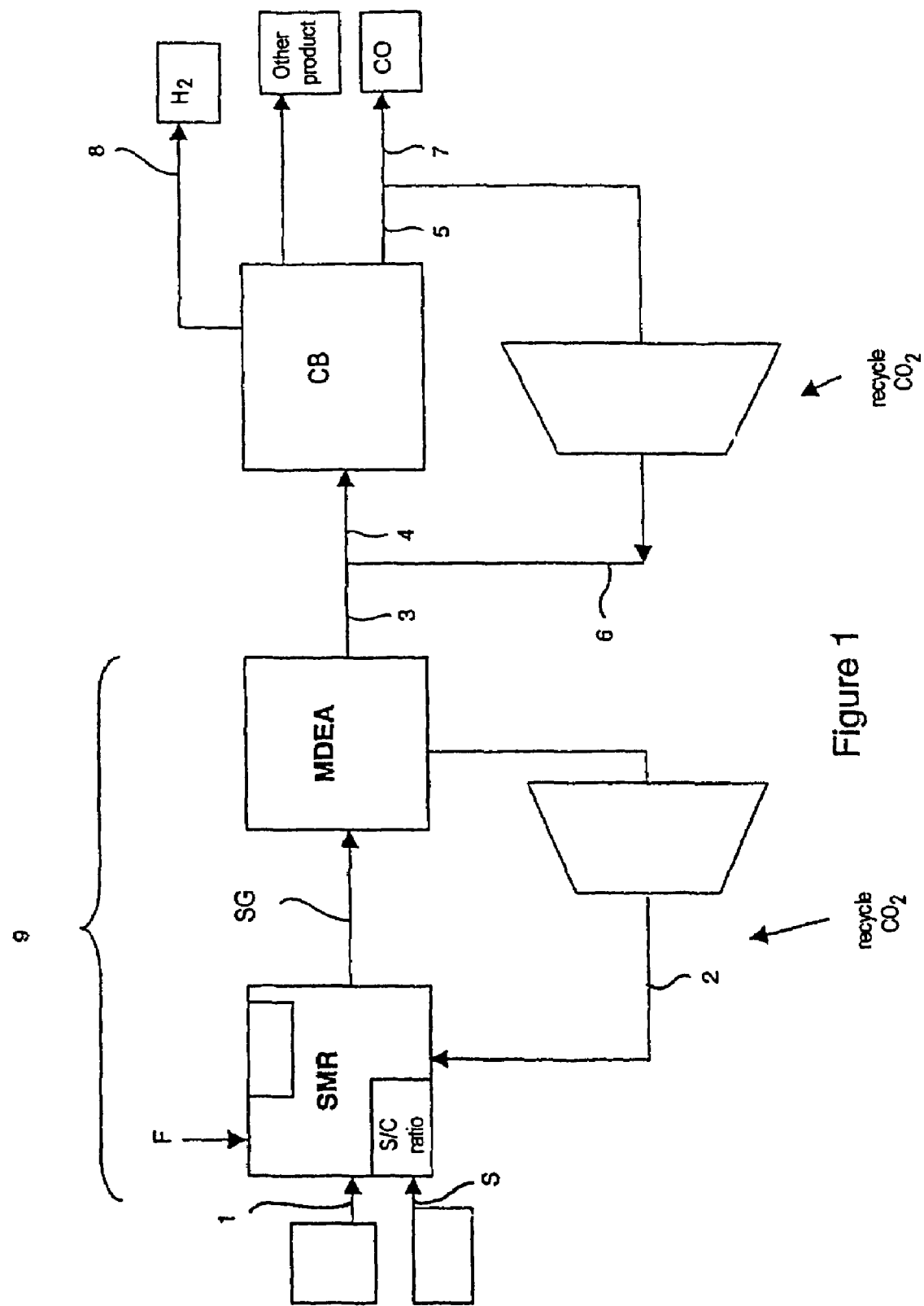

| | | | |
|---|---|---|---|
| 4,891,950 A * | 1/1990 | Seufert et al. | 62/657 |
| 5,102,645 A * | 4/1992 | Fisher et al. | 423/418.2 |
| 5,351,491 A | 10/1994 | Fabian | |
| 6,062,042 A * | 5/2000 | McNeil et al. | 62/625 |
| 6,073,461 A * | 6/2000 | McNeil et al. | 62/625 |
| 6,328,945 B1 * | 12/2001 | Hufton et al. | 423/418.2 |
| 6,467,306 B2 * | 10/2002 | McNeil | 62/622 |
| 2005/0034372 A1 | 2/2005 | Engler et al. | |
| 2005/0232854 A1 | 10/2005 | Dumont et al. | |
| 2006/0074132 A1 * | 4/2006 | Allam et al. | 518/702 |

* cited by examiner

METHOD AND APPARATUS FOR THE PRODUCTION OF CARBON MONOXIDE AND/OR HYDROGEN AND/OR A MIXTURE OF HYDROGEN AND CARBON MONOXIDE BY CRYOGENIC DISTILLATION

The present invention relates to a method and an installation for producing carbon monoxide and/or hydrogen and/or a mixture of hydrogen and carbon monoxide by cryogenic distillation.

Such methods are commonly supplied with a gas mixture containing carbon monoxide, hydrogen, nitrogen, methane and other impurities issuing from a production unit such as a reformer, a partial oxidation unit, or another unit for producing synthesis gas.

The gas mixture is separated in a cryogenic distillation unit to form carbon monoxide and/or hydrogen and/or a mixture of these two gases, for example, with a hydrogen/carbon monoxide ratio that differs from that of the feed mixture.

Ullmann's Encyclopedia of Industrial Chemistry, $5^{th}$ edition, volume A12, page 271 describes a methane scrubbing method in which part of the carbon monoxide is permanently recycled as reflux to the column for separating carbon monoxide and methane.

The cryogenic distillation unit is limited insofar as it cannot operate if the quantity of feed gas falls below a given value. Thus, if small quantities of product are required, the unit operates with the lowest possible feed gas rate, and the surplus products are vented to the atmosphere and flared. It is possible to reduce the minimum operating load of the unit by replacing the distillation trays with stacked packings. In fact, even with the packings, the maximum possible load reduction remains in the neighborhood of 50%.

While reducing the harmful effects of these practices, it is the object of the present invention to operate the cryogenic distillation unit with greater efficiency and improved the environmental aspects.

According to one object of the invention, a method is provided for producing carbon monoxide and/or hydrogen and/or a mixture of hydrogen and carbon monoxide by cryogenic distillation, comprising the steps of:

i) producing a feed mixture comprising at least carbon monoxide and hydrogen in a production apparatus;

ii) separating the feed mixture comprising at least carbon monoxide and hydrogen by cryogenic distillation in a separating unit comprising at least one column;

iii) collecting carbon monoxide and/or hydrogen and/or a mixture of hydrogen and carbon monoxide from the separating unit;

iv) in a first operating mode, sending a first quantity of feed mixture to be separated to the separating unit;

v) in the first operating mode, producing a quantity of end product that may be carbon monoxide, hydrogen or a mixture thereof;

vi) in a second operating mode, sending a second quantity of feed mixture to be separated from the production apparatus to the separating unit, a smaller quantity than the quantity sent in the first operating mode;

vii) in the second operating mode, producing a quantity of end product, a smaller quantity than the quantity produced during the first operating mode;

viii) in the second operating mode, drawing off from the separating unit at least one recycle gas containing carbon monoxide and/or hydrogen and/or methane and having a different composition from the composition of the feed mixture sent to the separating unit in the first operating mode, and sending at least one recycle gas to the separating unit to be separated therein and;

ix) in the second operating mode, modifying the flow rate and composition of the feed mixture produced by the production apparatus, according to the flow rate and composition of the at least one recycle gas.

According to other optional aspects:

the feed mixture contains up to 10 mol % methane and/or up to 10 mol % nitrogen and/or up to 10 mol % of other impurities;

one (the) recycle gas contains at least 5 mol % carbon monoxide;

one (the) recycle gas contains at least 25 mol % hydrogen;

at least one recycle gas is recycled only during the second operating mode when the need of one of the products falls below a threshold;

the separating unit contains a methane scrubbing column and/or a nitrogen scrubbing column and/or a carbon monoxide scrubbing column and/or a stripping column and/or a distillation column;

the composition and/or flow rate of the feed mixture produced by the production apparatus is modified during the second operating mode so that the carbon monoxide content of the second quantity of feed mixture decreases if the recycle gas is richer in carbon monoxide than the first quantity of feed mixture and/or so that the carbon monoxide content of the second quantity of feed mixture increases if the recycle gas is less rich in hydrogen than the first quantity of feed mixture;

the composition of the feed mixture produced by the production apparatus is modified during the second operating mode so that the hydrogen content of the second quantity of feed mixture decreases if the recycle gas is richer in hydrogen than the first quantity of feed mixture and/or so that the hydrogen content of the second quantity of feed mixture increases if the recycle gas is less rich in hydrogen than the first quantity of feed mixture;

the composition and/or flow rate of the feed mixture produced by the production apparatus is modified during the second operating mode so that the flow rate of the feed mixture entering the separating unit does not differ by more than 50% and preferably by more than 30% from the flow rate sent during the first mode;

the composition and/or flow rate of the feed mixture produced by the production apparatus is modified during the second operating mode so that the carbon monoxide content of the feed mixture entering the separating unit does not differ by ±5 mol %, preferably by ±3 mol % from the carbon monoxide content of the feed mixture entering the separating unit sent during the first operating mode;

the composition and/or flow rate of the feed mixture produced by the production apparatus is modified during the second operating mode so that the hydrogen content of the feed mixture entering the cold box (CB) does not differ by ±10% from the hydrogen content of the feed mixture entering the cold box sent during the first operating mode;

the composition and/or flow rate of the feed mixture produced by the production apparatus is modified during the second operating mode by modifying the operation of the production apparatus;

the operation of the production apparatus is modified by the following means:

i) by varying the ratio of carbon vapor if the production apparatus comprises a steam methane reformer and/or ii) by varying the operating temperature of at least one component of the apparatus, optionally the reaction temperature of the reformer and/or iii) by varying the flow rate of recycled carbon dioxide from a carbon dioxide stripper to a reformer and/or iv) by varying the flow rate feeding the production apparatus and/or v) by varying the oxygen/carbon ratio (if the production apparatus operates by partial oxidation).

According to another aspect of the invention, an installation is envisaged for producing hydrogen and/or carbon monoxide and/or a mixture of hydrogen and carbon monoxide, by separation, possibly by cryogenic distillation, of a feed mixture containing at least carbon monoxide and hydrogen, comprising a production apparatus for producing the feed mixture, means for sending the feed mixture to a separating unit, means for collecting hydrogen and/or carbon monoxide and/or a mixture of the two, drawn off as product(s) from the separating unit, means for drawing off at least one recycle gas from the separating unit, means for sending the recycle gas upstream of the separating unit to be separated with the feed mixture issuing from the production apparatus, and means for modifying the flow rate and composition of the feed mixture by modifying the operation of the production apparatus according to the flow rate and composition of at least one recycle gas.

According to other optional aspects, the installation comprises:

means for detecting the composition and flow rate of at least one recycle gas and of the feed mixture;

means for initiating the recycling of at least one recycle gas if the need of product falls below a threshold, and means for stopping the recycling of the at least one recycle gas if the need of the same product increases above a (the) threshold.

This also serves to reduce the flow rate of feed gas sent to the distillation unit if the needs of products are reduced.

The invention is described in greater detail with reference to FIG. 1, which is a schematic drawing of an apparatus according to the invention.

FIG. 1 shows an installation according to the invention comprising a synthesis gas production apparatus and a carbon monoxide and hydrogen production apparatus. The production apparatus 9 consists in this example of a steam methane reformer SMR and a $CO_2$ stripper MDEA which is used to purify the synthesis gas produced by the reformer.

The separating apparatus (CB) for separating carbon monoxide and hydrogen can operate by distillation, for example by methane scrubbing, partial condensation or any other known means.

A flow of methane 1 designated as feed flow is sent to a steam methane reformer SMR. The reformer SMR is also fed with a flow of steam S. A flow of synthesis gas SG is produced by the reformer SMR. Methane reforming is an endothermic reaction, so energy must be supplied in the form of heat to heat the furnace.

This heat is mainly provided by two sources of fuel F:

the purge gases from the unit like the PSA waste gas or the flash gas from the cold box natural gas.

The synthesis gas SG is then sent to the $CO_2$ stripper MDEA, which operates, for example, by the methanol diethanolamine method or by methanol scrubbing. The reformer SMR can be replaced in the synthesis gas production apparatus 9 by another type of apparatus such as an autothermal reformer or a partial oxidation apparatus.

The $CO_2$ stripper MDEA produces a flow 3 $CO_2$-free synthesis gas and a $CO_2$-enriched flow 2. The $CO_2$-enriched flow 2 can be recycled to the reformer SMR after compression in a compressor.

The flow 3 previously treated (by drying and final decarbonation) is sent to a cold box CB where it is cooled and separated by distillation to form a carbon monoxide rich flow 5, a hydrogen rich flow 8 and, optionally, a mixture of the two components (Oxogas, not shown) and/or methane and/or nitrogen. A part 7 of the gas 5 is used as a carbon-monoxide-rich product.

The main parameters affecting the quality and quantity of synthesis gas 3 produced at the outlet of the stripper MDEA are:

the ratio of the steam to the quantity of carbon in the fuel S/C (commonly called steam/carbon ratio)

the temperature T of the reaction of the furnace $CO_2$ recycle rate 2 feed rate 1.

For simplification, the isobaric situation will be considered.

The table below shows the major trends with their effects on the quality and quantity of synthesis gas production 3 at the outlet of the stripper MDEA.

| S/C | T | Q recycle $CO_2$ | Q Feed | Q Synthesis gas 3 produced | Ratio $H_2/CO$ in synthesis gas 3 produced | $CH_4$ in synthesis gas reproduced |
|---|---|---|---|---|---|---|
| → | ↘ | → | → | → | ↗ | ↗ |
| → | ↗ | → | → | → | ↘ | ↘ |
| ↘ | → | → | → | → | ↘ | ↗ |
| ↗ | → | → | → | → | ↗ | ↘ |
| → | → | ↘ | → | → | ↗ | → |
| → | → | ↗ | → | → | ↘ | → |
| → | → | → | ↘ | ↘ | → | → |
| → | → | → | ↗ | ↗ | → | → |

Thus, if the ratio of the steam to the quantity of carbon S/C is constant, the temperature T of the reaction or of the furnace increases, while the $CO_2$ recycle rate 2 and the feed rate 1 are constant, the $H_2/CO$ ratio in the synthesis gas 3 decreases, and also the quantity of methane in the synthesis gas 3.

By modifying the ratio of the steam to the quantity of carbon S/C and/or the temperature T of the reaction or of the furnace and/or the $CO_2$ recycle rate and/or the feed rate, it is possible to modify the $H_2/CO$ ratio in the synthesis gas 3 produced and/or the quantity of methane in the synthesis gas 3 produced, and the $CO_2/Co$ ratio (not mentioned in the table above).

The flowchart and the table shown below describe the case of an $H_2$ and CO production apparatus based on a reformer SMR fed with natural gas 1, a stripper MDEA to separate the $CO_2$ and a cold box CB to separate the $H_2$ and CO and, optionally, other components by cryogenic distillation.

Only the case of CO recycle is shown, but this can also be substituted or combined with a recycle of hydrogen (not shown) and/or of oxogas.

In the case described, the production of CO is reduced from 100 to 35%, while attempting to maintain the highest possible production of $H_2$.

In the base case with CO production corresponding to 100% (time 1), the main control parameters are the following:

S/C of SMR=1.5

T furnace 950° C.

100% $CO_2$ recycle

Nominal feed rate of SMR=100%.

For this case, there is no recycle of carbon monoxide, hydrogen or oxogas at the cold box.

To reduce the production of CO, initially (time 2) the $CO_2$ recycle 2 is reduced, until completely stopped (time 3), with the simultaneous sending of recycled carbon monoxide 6 from downstream of the cold box to upstream of the cold box to be mixed with the synthesis gas 3. The mixture is then cooled in the cold box and separated by distillation to supply the products.

No change is made to the parameters of S/C ratio or T furnace, only the feed rate 1 is reduced. A constant CO, $H_2$ and $CH_4$ content is thereby observed for the flow 4 sent to the cold box, while the treated flow 4 (consisting of synthesis gas 3 mixed with recycled carbon monoxide 6) remains approximately constant at the inlet of the cold box, whereas the CO and $H_2$ contents of the flow 3 at the outlet of the MDEA change, producing a reduction for the CO content and an increase for the $H_2$ content, and the flow rate produced by the MDEA changes marginally.

As soon as the $CO_2$ recycle is stopped (time 3), the CO production rate continues to decrease while continuing to increase the CO recycle 6 and modifying the other parameters such as the S/C ratio and/or furnace temperature and/or the feed rate.

Times 4 to 7 represent these additional steps.

The approximately constant CO, $H_2$ and $CH_4$ content of the flow 4 can be observed at the inlet of the cold box CB compared with the flow rate measured at time 1, the treated flow rate falling slightly. At the same time, the CO and $H_2$ and $CH_4$ content of the flow 3 and the flow 3 at the outlet of the MDEA change, with a reduction for the CO content and an increase for the $H_2$ and $CH_4$ contents, while the flow itself decreases.

Time 8 is an extreme point when no further modification (S/C, $T_{furnace}$) is made to the reformer apart from reducing the feed rate 1. Simultaneously, the CO recycle rate 6 continues to be increased to reduce production.

The installation according to the invention comprises means (not shown) to detect the composition and flow rate of the at least one recycle gas 6 and of the feed mixture 3. By comparing them, it is possible to adjust the flow rate and composition of the mixture 4 entering the separating unit, in order to obtain stable operation even in case of low production.

The installation also comprises means (not shown) to initiate the recycling of at least one recycle gas if the need of product decreases below a threshold, and means for stopping the recycling of the at least one recycle gas if the need of the same product increases above a (the) threshold.

| | (1) Gas to be treated $CH_4$ [mol/h] | S/C ratio | $T_{furnace}$ [° C.] | (2) $CO_2$ recycle [mol/h] | (3) MDEA outlet [mol/h] | (3) $CH_4$ [%] | (3) CO [%] | (3) $H_2$ [%] | (4) CB feed [mol/h] | (4) $CH_4$ [%] |
|---|---|---|---|---|---|---|---|---|---|---|
| 1 | 1000 | 1.5 | 950 | 90.9 | 3178 | 8.5 | 23 | 68.5 | 3177 | 8.5 |
| 2 | 980 | 1.5 | 950 | 44 | 3144 | 8.5 | 21.6 | 70 | 3173 | 8.3 |
| 3 | 970 | 1.5 | 950 | 0 | 3083 | 8.5 | 20.2 | 71.4 | 3191 | 8.2 |
| 4 | 942 | 2 | 920 | 0 | 2954 | 9.4 | 17.7 | 73 | 3162 | 8.8 |
| 5 | 900 | 2.9 | 880 | 0 | 2847 | 9.1 | 14.8 | 76.1 | 3155 | 8.2 |
| 6 | 865 | 3.4 | 860 | 0 | 2746 | 8.8 | 13.6 | 77.6 | 3105 | 7.8 |
| 7 | 770 | 3.5 | 850 | 0 | 2438 | 8.8 | 13.2 | 78 | 2847 | 7.6 |
| 8 | 650 | 3.5 | 850 | 0 | 2058 | 8.8 | 13.2 | 78 | 2516 | 7.2 |

| | (4) CO [%] | (4) $H_2$ [%] | (5) CB CO production [mol/h] | (6) CO recycle [mol/h] | (7) CO sent to client [mol/h] | CO production ratio | (8) $H_2$ sent to client [mol/h] | $H_2$ production ratio |
|---|---|---|---|---|---|---|---|---|
| 1 | 23 | 68.5 | 709 | 0 | 709 | 100% | 2091 | 100% |
| 2 | 23 | 68.7 | 709 | 59 | 650 | 92% | 2114 | 101% |
| 3 | 22.9 | 69 | 708 | 109 | 600 | 85% | 2136 | 102% |
| 4 | 23.1 | 68.2 | 708 | 209 | 500 | 71% | 2092 | 100% |
| 5 | 23.1 | 68.7 | 708 | 309 | 400 | 56% | 2102 | 101% |
| 6 | 23.6 | 68.6 | 709 | 359 | 350 | 49% | 2066 | 99% |
| 7 | 25.7 | 66.8 | 709 | 409 | 300 | 42% | 1845 | 88% |
| 8 | 29 | 63.7 | 709 | 459 | 250 | 35% | 1555 | 74% |

| Without invention | (1) Gas to be treated CH4 [mol/h] | S/C ratio | $T_{furnace}$ [° C.] | (2) CO2 recycle [mol/h] | Fuel [mol/h] | (3) MDEA outlet [mol/h] | (3) % CH4 | (3) % CO | (3) % H2 | (4) CB feed [mol/h] |
|---|---|---|---|---|---|---|---|---|---|---|
| 1 | 1000 | 1.5 | 950 | 90.9 | 253 | 3178 | 8.5 | 23 | 68.5 | 3177 |
| 2 | 700 | 1.5 | 950 | 63.6 | 177 | 2224 | 8.5 | 23 | 68.5 | 2224 |
| 3 | 700 | 1.5 | 950 | 0 | 68.2 | 2224 | 8.5 | 20.2 | 71.4 | 2224 |
| 4 | 475 | 2.5 | 950 | 0 | 78 | 1615 | 6.5 | 18 | 75.5 | 1614 |
| 5 | 475 | 2.5 | 950 | 0 | 78 | 1615 | 6.5 | 18 | 75.5 | 1614 |

-continued

| Without invention | (4) Ratio of CB feed to 1 | (4) % CH4 | (4) % CO | (4) % H2 | (5) CB CO production [mol/h] | CO venting [mol/h] | (7) CO sent to client [mol/h] | Ratio CO produced |
|---|---|---|---|---|---|---|---|---|
| 1 | 100% | 8.5 | 23 | 68.5 | 709 | 0 | 709 | 100% |
| 2 | 70% | 8.5 | 23 | 68.5 | 496 | 0 | 496 | 70% |
| 3 | 70% | 8.5 | 20.2 | 71.4 | 434 | 0 | 434 | 61% |
| 4 | 51% | 6.5 | 18 | 75.5 | 281 | 0 | 281 | 40% |
| 5 | 51% | 6.5 | 18 | 75.5 | 281 | 119 | 162 | 23% |

| With invention | (1) Gas to be treated CH4 [mol/h] | S/C ratio | $T_{furnace}$ [° C.] | (2) CO2 recycle [mol/h] | Fuel [mol/h] | (3) MDEA outlet [mol/h] | (3) % CH4 | (3) % CO | (3) % H2 | (4) CB feed [mol/h] |
|---|---|---|---|---|---|---|---|---|---|---|
| 1 | 1000 | 1.5 | 950 | 90.9 | 253 | 3178 | 8.5 | 23 | 68.5 | 3177 |
| 2 | 700 | 1.5 | 950 | 63.6 | 177 | 2224 | 8.5 | 23 | 68.5 | 2224 |
| 3 | 700 | 1.5 | 950 | 0 | 68.2 | 2224 | 8.5 | 20.2 | 71.4 | 2305 |
| 4 | 450 | 3.5 | 850 | 0 | 19 | 1425 | 8.8 | 13.2 | 78 | 1604 |
| 5 | 420 | 3.5 | 850 | 0 | 17 | 1330 | 8.8 | 13.2 | 78 | 1602 |

| With invention | (4) Ratio of CB feed | (4) % CH4 | (4) % CO | (4) % H2 | (5) CB CO production [mol/h] | (6) CO recycle [mol/h] | (7) CO sent to client [mol/h] | Ratio CO produced |
|---|---|---|---|---|---|---|---|---|
| 1 | 100% | 8.5 | 23 | 68.5 | 709 | 0 | 709 | 100% |
| 2 | 70% | 8.5 | 23 | 68.5 | 496 | 0 | 496 | 70% |
| 3 | 73% | 8.2 | 23 | 68.9 | 513 | 81 | 432 | 61% |
| 4 | 50% | 7.8 | 23 | 69.2 | 357 | 180 | 177 | 25% |
| 5 | 50% | 7.3 | 28 | 64.7 | 434 | 272 | 162 | 23% |

The flow rate of fuel described corresponds to the portion of the natural gas used for heating.

Without the invention, as may be seen in point 5, 23% of the nominal flow rate is produced, but by venting 119 mol/h of CO to the air, and by consuming 475+78=553 mol/h of natural gas.

With the invention of the same point, 23% of the nominal flow rate is produced, without venting to the air and while only consuming 420+17=437 mol/h of natural gas.

Consequently, at equivalent production for the client with the invention, 26% less $CH_4$ is consumed than without the invention.

The invention claimed is:

1. A method for producing carbon monoxide and/or hydrogen and/or a mixture of hydrogen and carbon monoxide by cryogenic distillation, comprising the steps of:
   a) producing a feed mixture comprising at least carbon monoxide and hydrogen in a production apparatus;
   b) separating the feed mixture comprising at least carbon monoxide and hydrogen by cryogenic distillation in a separating unit (CB) comprising at least one column;
   c) collecting carbon monoxide and/or hydrogen and/or a mixture of hydrogen and carbon monoxide from the separating unit;
   d) in a first operating mode, sending a first quantity of feed mixture to be separated to the separating unit;
   e) in the first operating mode, producing a quantity of end product that may be carbon monoxide, hydrogen or a mixture thereof;
   f) in a second operating mode, sending a second quantity of feed mixture to be separated from the production apparatus to the separating unit, a smaller quantity than the quantity sent in the first operating mode;
   g) in the second operating mode, producing a quantity of end product a smaller quantity than the quantity produced during the first operating mode;
   h) in the second operating mode, drawing off from the separating unit at least one recycle gas containing carbon monoxide and/or hydrogen and/or methane and having a different composition from the composition of the feed mixture sent to the separating unit in the first operating mode, and sending at least one recycle gas to the separating unit to be separated therein and;
   i) in the second operating mode, modifying the flow rate and composition of the feed mixture produced by the production apparatus, according to the flow rate and composition of the at least one recycle gas.

2. The method as claimed in claim 1, in which the feed mixture contains up to 10 mol % of methane and/or up to 10 mol % of nitrogen and/or up to 10 mol % of other impurities.

3. The method as claimed in claim 1, in which one (the) recycle gas contains at least 5 mol % of carbon monoxide.

4. The method as claimed in claim 1, in which one (the) recycle gas contains at least 25 mol % of hydrogen.

5. The method as claimed in claim 1, in which at least one recycle gas is recycled only during the second operating mode when the need of one of the products falls below a threshold.

6. The method as claimed in claim 1, in which the composition and/or flow rate of the feed mixture produced by the production apparatus is modified during the second operating mode so that the carbon monoxide content of the second quantity of feed mixture decreases if the recycle gas is richer in carbon monoxide than the first quantity of feed mixture and/or so that the carbon monoxide content of the second quantity of feed mixture increases if the recycle gas is less rich in carbon monoxide than the first quantity of feed mixture.

7. The method as claimed in claim 1, in which the composition of the feed mixture produced by the production apparatus is modified during the second operating mode so that the hydrogen content of the second quantity of feed mixture decreases if the recycle gas is richer in hydrogen than the first quantity of feed mixture and/or so that the hydrogen content of the second quantity of feed mixture increases if the recycle gas is less rich in hydrogen than the first quantity of feed mixture.

8. The method as claimed in claim 1, in which the composition and/or flow rate of the feed mixture produced by the production apparatus is modified during the second operating mode so that the flow rate of the feed mixture entering the separating unit does not differ by more than 50% from the flow rate sent during the first mode.

9. The method as claimed in claim 1, in which the composition and/or flow rate of the feed mixture produced by the production apparatus is modified during the second operating mode so that the carbon monoxide content of the feed mixture entering the separating unit does not differ by ±5% from the carbon monoxide content of the feed mixture entering the separating unit (CB) sent during the first mode.

10. The method as claimed in claim 1, in which the composition and/or flow rate of the feed mixture produced by the production apparatus is modified during the second operating mode so that the hydrogen content of the feed mixture entering the separating unit (CB) does not differ by ±10% from the hydrogen content of the feed mixture entering the separating unit sent during the first mode.

11. The method as claimed in claim 1, in which the composition and/or flow rate of the feed mixture produced by the production apparatus is modified during the second operating mode by modifying the operation of the production apparatus.

12. The method as claimed in claim 11, in which the operation of the production apparatus is modified by the following means:
   a) by varying the ratio of carbon vapor in the feed to the production apparatus if the production apparatus comprises a steam methane reformer (SMR) and/or
   b) by varying the operating temperature of at least one component of the apparatus, optionally the reaction temperature of the reformer (SMR) and/or
   c) by varying the flow rate of recycled carbon dioxide from a carbon dioxide stripper (MDEA) to a reformer (SMR) and/or
   d) by varying the flow rate feeding the production apparatus and/or
   e) by varying the oxygen/carbon ratio of the feed to the production apparatus (if the production apparatus operates by partial oxidation).

13. An installation for producing hydrogen and/or carbon monoxide and/or a mixture of hydrogen and carbon monoxide, by separation, by cryogenic distillation, of a feed mixture containing at least carbon monoxide and hydrogen, comprising a production apparatus for producing the feed mixture, means for sending the feed mixture to a separating unit (CB), means for collecting hydrogen and/or carbon monoxide and/or a mixture of both, drawn off as product(s) from the separating unit, means for drawing off at least one recycle gas from the separating unit, means for sending the recycle gas upstream of the separating unit to be separated with the feed mixture issuing from the production apparatus, and means for modifying the flow rate and composition of the feed mixture by modifying the operation of the production apparatus according to the flow rate and composition of at least one recycle gas.

14. The installation as claimed in claim 13, comprising means for detecting the composition and flow rate of the at least one recycle gas and of the feed mixture.

15. The installation as claimed in claim 13, comprising means for initiating the recycling of the at least one recycle gas if the need of product falls below a threshold, and means for stopping the recycling of the at least one recycle gas if the need of the same product increases above a (the) threshold.

16. An installation as claimed in claim 13, in which the separating unit (CB) contains a methane scrubbing column and/or a nitrogen scrubbing column and/or a carbon monoxide scrubbing column and/or a stripping column and/or a distillation column.

* * * * *